(12) United States Patent
Brombach

(10) Patent No.: US 12,308,652 B2
(45) Date of Patent: May 20, 2025

(54) METHOD FOR FEEDING ELECTRICAL POWER INTO AN ELECTRICAL SUPPLY NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

(*) Notice: Subject to any disclaimer, the term of this patent is extended or adjusted under 35 U.S.C. 154(b) by 540 days.

(21) Appl. No.: 17/564,015

(22) Filed: Dec. 28, 2021

(65) Prior Publication Data
US 2022/0209538 A1   Jun. 30, 2022

(30) Foreign Application Priority Data
Dec. 30, 2020 (EP) .................................... 20217867

(51) Int. Cl.
H02J 3/38 (2006.01)
H02J 3/00 (2006.01)
H02J 3/46 (2006.01)

(52) U.S. Cl.
CPC ............. *H02J 3/381* (2013.01); *H02J 3/001* (2020.01); *H02J 3/388* (2020.01); *H02J 3/46* (2013.01); *H02J 2300/28* (2020.01)

(58) Field of Classification Search
CPC .. H02J 3/381; H02J 3/001; H02J 3/388; H02J 3/46
(Continued)

(56) References Cited

U.S. PATENT DOCUMENTS

| 4,616,162 A * | 10/1986 | Radomski ................ B60L 1/00 388/822 |
| 2004/0075278 A1 * | 4/2004 | Canini ..................... F03D 9/25 290/55 |

(Continued)

FOREIGN PATENT DOCUMENTS

| DE | 10 2016 115 431 A1 | 2/2018 |
| DE | 10 2017 112 944 A1 | 12/2018 |
| DE | 10 2017 113 006 A1 | 12/2018 |

OTHER PUBLICATIONS

Noll, Theresa, et al. "Investigation of load-frequency-control with increasing penetration of converter-based generators." IEEE PES Innovative Smart Grid Technologies, Europe. IEEE, 2014. (Year: 2014).*

Primary Examiner — Mohammad Ali
Assistant Examiner — Joshua T Sanders
(74) Attorney, Agent, or Firm — Seed IP Law Group LLP

(57) ABSTRACT

Provided is a method for feeding electrical power into an electrical supply network comprising a plurality of consumers for consuming power and a plurality of infeed apparatuses for feeding power. An infeed apparatus is a converter or conventional infeed apparatus and has a rated power. A converter infeed apparatus feeds power using a frequency converter or inverter, and a conventional infeed apparatus denotes all other infeed apparatuses. The infeed is controlled depending on a static converter penetration and a dynamic converter penetration of the network or a section thereof. The static converter penetration denotes a ratio of a sum of rated powers of all converter infeed apparatuses connected to the network or section to a sum of rated powers of all infeed apparatuses, and the dynamic converter penetration denotes a ratio of power fed in by all converter infeed apparatuses to power fed in by all infeed apparatuses.

16 Claims, 4 Drawing Sheets

(58) Field of Classification Search
USPC .......................................................... 700/287
See application file for complete search history.

(56) References Cited

U.S. PATENT DOCUMENTS

| | | | |
|---|---|---|---|
| 2019/0211803 A1* | 7/2019 | Brombach | F03D 9/007 |
| 2020/0116127 A1* | 4/2020 | Brombach | H02J 3/46 |
| 2020/0119560 A1* | 4/2020 | Brombach | H02P 9/04 |
| 2022/0200282 A1* | 6/2022 | Alali | H02J 3/01 |

* cited by examiner

METHOD FOR FEEDING ELECTRICAL POWER INTO AN ELECTRICAL SUPPLY NETWORK

BACKGROUND

Technical Field

The present invention relates to a method for feeding electrical power into an electrical supply network. The invention also relates to a wind energy system comprising one or a plurality of wind power installations configured for feeding electrical power into an electrical supply network.

Description of the Related Art

Methods for feeding electrical power into an electrical supply network are known. They often have the task not only of supplying the electrical supply network and thus the connected consumers with electrical power, but also of ensuring or at least supporting a stability of the electrical supply network. Conventional large power plants use directly coupled synchronous generators for this, and the great inertia of such large synchronous generators has a stabilizing effect for the electrical supply network. That is achieved in particular by means of the underlying physical behavior of such synchronous generators.

Nowadays, however, the proportion of decentralized infeed apparatuses, in particular wind power installations or windfarms and photovoltaic installations, is increasing. Such infeed apparatuses feed in by means of a frequency converter or frequency inverter and may therefore also be referred to as converter infeed apparatuses. The difference between the frequency converter and frequency inverter is unimportant for the matter at hand and for simplification, therefore, hereinafter reference is made only to converter or converter infeed apparatus.

The current to be fed in can be predefined by such converters comparatively freely, in particular with regard to magnitude, frequency and phase. A current fed in by such converters does not react directly to changes in the electrical supply network, and at any rate reacts to a significantly lesser extent than is the case for a directly coupled synchronous generator. Such a converter infeed apparatus therefore does not have an intrinsic stabilization property. Instead, however, it is possible to implement concrete modes of behavior in a targeted manner in the case of such a converter infeed apparatus.

The infeed apparatuses used thus have effects on the fundamental behavior of the electrical supply network. That in turn can also influence how such an electrical supply network should be kept stable.

In principle, converter infeed apparatuses could be programmed so as to behave similarly to directly coupled synchronous generators. What would be disadvantageous about that, however, is that it is difficult to emulate such a behavior exactly. That is due to the fact, inter alia, that a change in the electrical supply network, e.g., a voltage change, to which a directly coupled synchronous generator would react immediately and directly on account of its physical property, in the case of a converter infeed apparatus, would firstly have to be detected metrologically. However, the free controllability of a converter infeed apparatus opens up new control possibilities which could not be utilized, or could be utilized less well, if the converter infeed apparatus were programmed so as to behave similarly to a directly coupled synchronous generator.

An additional factor is that converter infeed apparatuses usually effect decentralized infeed, in contrast to conventional large power plants. Furthermore, it should be taken into account that converter infeed apparatuses are usually embodied as wind power installation, windfarm or photovoltaic installation and have to take account of a fluctuating input energy as a result.

Therefore, it would appear to be expedient to take account of the special features of such converter infeed apparatuses and to use them as advantageously as possible.

In the priority application with respect to the present application, the European Patent Office searched the following prior art: DE 10 2016 115 431 A1; DE 10 2017 113 006 A1 and DE 10 2017 112 944 A1.

BRIEF SUMMARY

One or more embodiments are directed to stabilizing the electrical supply network as the proportion of converter infeed apparatuses in the electrical supply network increases.

A method is provided for feeding electrical power into an electrical supply network. The electrical supply network taken as a basis here comprises a plurality of consumers for consuming electrical power from the electrical supply network and a plurality of infeed apparatuses for feeding electrical power into the electrical supply network. An infeed apparatus can be provided in each case as a converter infeed apparatus or as a conventional infeed apparatus and can be characterized in each case by a rated power.

Converter infeed apparatus denotes an infeed apparatus which feeds in by means of at least one frequency converter or frequency inverter. Conventional infeed apparatus denotes all other infeed apparatuses. In this case, a converter infeed apparatus can be in particular a wind power installation, a windfarm or a photovoltaic installation. In this case, the converter, in particular frequency inverter, obtains electrical energy on the input side, said electrical energy basically still being unconditioned. The electrical energy can be provided for example as a DC current having a fluctuating amplitude. On the basis of this input energy, the frequency converter or frequency inverter generates an AC current for feeding into the electrical supply network.

Furthermore, provision is made for the infeed to be controlled depending on a static converter penetration and depending on a dynamic converter penetration of the electrical supply network or of a network section thereof.

In particular, provision is made for the infeed to be controlled in accordance with a control strategy. This control strategy can concern all infeed apparatuses or only a portion thereof. In this case, the control strategy can take account of which or how many infeed apparatuses implement it.

Provision is thus made for the control strategy to be selected depending on the static converter penetration and depending on the dynamic converter penetration of the electrical supply network or of a network section thereof. Both types of converter penetration are thus taken into account by the control strategy. In this case, both types of converter penetration concern the electrical supply network or a network section thereof.

In this case, the static converter penetration denotes a ratio of a sum of the rated powers of all converter infeed apparatuses connected to the electrical supply network or the network section to a sum of the rated powers of all infeed apparatuses connected to the electrical supply network or the network section. Here, therefore, the rated powers of the respective infeed apparatuses are considered, irrespective of whether this rated power is fed in, whether only a lower power is fed in, or whether possibly no power at all is fed in. All that matters here is what fundamental potential for power infeed is present for the respective infeed apparatus. In this case, the rated power usually characterizes an infeed apparatus, be it a converter infeed apparatus or a conventional infeed apparatus. The rated power often corresponds to the maximum power of the respective infeed apparatus, at any rate to the maximum power that is permitted to be fed in permanently.

For taking account, however, the corresponding infeed apparatus has to be connected to the electrical supply network or the network section. This involves an electrically effective connection, in particular a galvanic connection between the respective infeed apparatus and the electrical supply network. In the case of the converter infeed apparatus, that can mean that there is a galvanic connection between the converter or inverter of the converter infeed apparatus and the electrical supply network, without the converter or inverter having to generate a pulse pattern for feeding in an electric current at that moment. It would be possible, however, immediately to predefine such a pulse pattern for generating a current to be fed in.

The dynamic converter penetration denotes a ratio of a quantity of power fed in by all converter infeed apparatuses connected to the electrical supply network or the network section to a quantity of power fed in by all infeed apparatuses connected to the electrical supply network or the network section. Therefore, the dynamic converter penetration does not involve power able to be fed in, but rather power presently being concretely fed in.

If an electrical supply network comprises for example a large power plant having a rated power of 2 gigawatt (GW), and also ten windfarms each having 50 wind power installations, each with a rated power of 4 megawatt (MW), then the static converter penetration is (10×50×4 MW)/(10×50×4 MW+2 GW)=0.5=50%. If here all the wind power installations feed in with half their rated power in each case, but the large power plant feeds in with rated power, then the dynamic converter penetration is (10×50×0.5×4 MW)/(10×50×0.5×4 MW+2 GW)=⅓=33%.

If the wind then decreases, the dynamic converter penetration can become even smaller. In this respect, one property of the dynamic converter penetration is also that it is much more variable than the static converter penetration. The static converter penetration can also change, but for that an infeed apparatus would have to be disconnected from the electrical supply network, or be connected to the electrical supply network.

It has been recognized that the converter penetration can fundamentally characterize the electrical supply network and can influence the way in which infeed is effected and can thus be controlled. In this case, it has been recognized that a change in the electrical supply network as a result of an increase in renewable infeed apparatuses thus also gives rise to an increase in the proportion of converter infeed apparatuses in the electrical supply network, and that it may therefore be expedient to take account of this proportion of converter infeed apparatuses.

It has additionally been recognized that both a static proportion and a dynamic proportion can be relevant, that different properties can be associated therewith, and that should be considered in a differentiated manner. Details concerning the differences and their potential effects will also be described below.

In order to detect a static converter penetration and also a dynamic converter penetration, corresponding data can be transmitted from the respective infeed apparatuses to a central unit (e.g., central controller). The items of information from the comparatively small number of large power plants are usually connected together in a control center. The latter then has available at least the information of how much electrical power is fed in by the respective large power plant, or else other conventional power plants, and also whether the relevant power plant is actually connected to the electrical supply network. These data can be used for assessing both the static and the dynamic converter penetration.

Converter infeed apparatuses are usually controlled by way of supervisory control and data acquisition (SCADA) and in this case operating data of the converter infeed apparatuses are also communicated to a corresponding control and monitoring unit (e.g., controller). The necessary data both concerning conventional power plants and concerning converter infeed apparatuses are thus available. If such information is not available with regard to one or a few converter infeed apparatuses, then this small number of converter infeed apparatuses could be concomitantly taken into account in an estimation. In this case, the level of the power able to be fed in can be estimated depending on the prevailing wind in the case of wind power installations, and depending on the insolation present in the case of photovoltaic installations. The fact of whether individual converter infeed apparatuses are disconnected from the network can be taken into account by way of probability considerations, or by way of known maintenance cycles or plans.

In accordance with one aspect, it is proposed that the infeed or the control strategy is additionally controlled or selected depending on the converter reserve power, wherein the converter reserve power denotes a ratio of a quantity of power fed into the electrical supply network or the network section by all converter infeed apparatuses to a quantity of power to which the converter infeed apparatuses can increase their quantity of power fed in.

This aspect is based on the possibility, in particular, that converter infeed apparatuses, for the purpose of a potential network backup, feed in less power than they could. The power by which the power fed in is thus reduced can be regarded as reserve power. In this case, the converter reserve power denotes the sum of all these reserve powers which all converter infeed apparatuses of the electrical supply network or of the network section have at the moment under consideration. In other words, this involves the case that one or a plurality of converter infeed apparatuses are curtailed and this curtailment is taken into account. This therefore involves a permanent reserve power, i.e., a power by which the present operating point could also be increased permanently, in particular at least around 10 minutes.

This should be differentiated from a power by which the converter infeed apparatus could be increased momentarily, e.g., for 10 seconds. Such a momentary increase would be possible as a result of kinetic energy of a rotor of a wind power installation being converted into power additionally fed in. Such a property may also be of importance, but ought not to be taken into account in the consideration of the converter reserve power.

In accordance with one aspect, it is proposed that a static converter penetration is estimated depending on at least one estimation criterion of a first group from the following list
    a detected wind speed,
    a detected insolation,
    a detected present network load of the electrical supply network or of the network section,
    an activation specification as a specification for activating converter infeed apparatuses, and a known number of connected, but non-infeeding converter infeed apparatuses.

One estimation criterion of the first group is a detected wind speed. The latter can be compared with a minimum wind speed and if it is above that, it should be assumed for the converter infeed apparatuses embodied as wind power installations or as windfarms that these are connected to the electrical supply network.

Correspondingly, a detected insolation is a further estimation criterion of the first group. Here, too, it is possible to effect a comparison with a minimum insolation starting from which an inverter of a photovoltaic installation actually begins to operate in the first place. If the detected insolation is thus high enough, it should be assumed that the converter infeed apparatuses embodied as a photovoltaic installation are connected to the electrical supply network.

In particular, it is conceivable that converter infeed apparatuses are connected to the network precisely if they are embodied as renewable infeed apparatuses and their own demand is covered by the primary source, i.e., by the wind or the insolation. It is then also conceivable that these converter infeed apparatuses are connected to the electrical supply network, but do not feed in, or do not significantly feed in. However, if the wind speed or insolation is still significantly lower, keeping the corresponding converter infeed apparatuses ready would require more energy than is available from wind or sun. To that end, therefore, power would have to be drawn from the electrical supply network, but that is intended to be avoided, and so a switch-off and thus disconnection of the relevant converter infeed apparatuses from the electrical supply network should be expected.

A further estimation criterion of the first group can be an activation specification, which is a specification for activating converter infeed apparatuses. Such an activation specification can in particular be predefined by a network operator and for example prescribe the activation or deactivation of converter infeed apparatuses depending on a load situation. An activation or deactivation depending on a power exchange between the network section and another network section, in particular a higher network level, can also be an activation specification. An activation specification can also be an activation or deactivation of converter infeed apparatuses depending on installed or infeeding power plant capacities.

A detected present network load of the electrical supply network or of the network section is thus proposed as one estimation criterion of the first group. The present network load can thus influence, in particular by way of a corresponding specification, which and/or how many converter infeed apparatuses are connected to the electrical supply network.

A known number of connected, but non-infeeding converter infeed apparatuses is also proposed as one estimation criterion of the first group. Such connected, but non-infeeding converter infeed apparatuses can be for example so-called STATCOM installations, or installations, in particular photovoltaic installations, which feed in a reactive power at night, which comprise a converter or inverter that actually enables them to feed into the electrical supply network, but which actually operate for example only as phase shifters. Such non-infeeding converter infeed apparatuses are usually known in the electrical supply network or the network section and can therefore be taken into account accordingly.

Additionally or alternatively, it is proposed that a dynamic converter penetration is estimated depending on at least one estimation criterion from a second groups in accordance with the following list a detected power fed into the electrical supply network from renewable energy sources, a detected present network load of the electrical supply network or of the network section, and a detected converter reserve power.

One estimation criterion of the second group is a detected power fed into the electrical supply network from renewable energy sources. Such a power fed in is often known and can be communicated to a corresponding central control unit (e.g., central controller) by way of SCADA, for example. However, it is also conceivable that converter infeed apparatuses provide such a power fed in as information, without this being passed to a control unit (e.g., controller). Such information can then nevertheless be used as an estimation criterion. The fed-in power thus detected can accordingly directly influence the determination of the dynamic converter penetration.

A detected present network load of the electrical supply network or of the network section is proposed as a further estimation criterion of the second group. If such a present network load is known, i.e., how much power is presently being consumed by the consumers connected to the electrical supply network, power fed in by converters can also be inferred therefrom, particularly if the fed-in power of conventional power plants is additionally known.

A detected converter reserve power is proposed as one estimation criterion from the second group. In particular taking further account of the power presently able to be fed in, said detected converter reserve power makes it possible to estimate how much power is actually fed in by the converter infeed apparatuses, namely less by the amount of the detected converter reserve power.

In addition, for estimating the dynamic converter penetration, wind speeds and/or insolation can be detected. It is possible to derive therefrom how much power could at least be generated by the corresponding renewable generators. In addition, it is also possible, of course, to take account of specifications or circumstances which lead to converter infeed apparatuses being switched off, such as have been explained above in association with the first group. That is of importance for the estimation of the dynamic converter penetration particularly if enough power could indeed be fed in, but this is not possible on account of a switch-off specification.

In accordance with one aspect, it is proposed that from a detected static converter penetration a control property of a first group is derived, in accordance with the following list. Such a control property describes, in particular, the way in which it is possible to effect control on the part of the electrical supply network or the network section under consideration. The control property can thus synonymously also be referred to as control capability.

It has been recognized here in particular that from a detected static converter penetration a control property can be derived, basically as an intrinsic property of the electrical supply network or of the network section. Knowledge of such properties can then be used further for selecting or setting control specifications. The static converter penetration can have different values and theoretically range from 0 to 100%. The respective control property derived from the static converter penetration is correspondingly distinctive as well.

It is also conceivable, however, to take as a basis a threshold value for the static converter penetration, starting from which threshold value a control property is first derived. Said threshold value is preferably in the range of 20 to 50%.

A further possible control property of the first group is a reactive power adjustment capability with a reactive power adjustment range. By means of converter infeed apparatuses, the infeed of a reactive power proportion can be predefined comparatively freely and the reactive power can thereby be set. It is conceivable, in particular, that a converter infeed apparatus can set reactive power from 0 to 100% relative to the value of its rated power. However, in order to ensure high efficiency, a lower upper limit could be fixed, for example of 80%. The reactive power adjustment range would then be from 0% to 80%, relative to the rated power.

A further control property of the first group is a dynamic network backup property characterized by a short circuit current able to be fed in. The dynamic network backup property thus specifies how much short circuit current can be fed in as necessary or in a corresponding situation. Here, too, this dynamic network backup property, in particular the short circuit current able to be fed in, in terms of level, can be dependent on the magnitude of the detected static converter penetration. Particularly for network faults in which there is a dip in the network voltage but which often have only a very short duration, the infeed of a short circuit current can achieve or at least contribute to a rapid fault ride through. By way of the dynamic network backup property and thus by way of the detected static converter penetration, this property can be estimated in advance.

Moreover, a network disconnecting switch can be triggered by a sufficiently large short circuit current. What can be achieved thereby is that parts of a network section are disconnected and are thus protected in a targeted manner. In other words, a selective network protection can thus be achieved.

A potential for providing an instantaneous reserve is proposed as a further control property of the first group. An instantaneous reserve can be provided in particular by wind power installations, such that it is advantageous, in addition to the detected static converter penetration, to estimate or to detect a proportion provided by wind power installations in the static converter penetration.

In the case of an instantaneous reserve, an additional power can be fed in spontaneously, in particular within 10 to 20 ms, but only for a short time of 5 to 30 seconds, in particular approximately for 10 seconds. Said additional power can be for example in the range of 10 to 20% of the rated power. It is provided by the rotor of the wind power installation being decelerated in order thereby to draw kinetic energy and to feed in said additional power therefrom. In principle, however, electrical storage units (e.g., batteries) are also conceivable as energy source, as a result of which the potential for providing an instantaneous reserve would not be reserved exclusively for a wind power installation.

A potential for providing an instantaneous reserve can be provided even in the event of little wind and little fed-in power or no fed-in power at all, but when there is at least enough wind present that the wind power installation can rotate while idling. In that case, specifically, the wind power installation nevertheless correspondingly has kinetic energy and can provide and feed in an instantaneous reserve, i.e., additional power from said kinetic energy.

As a further control property of the first group, a degree of voltage impressing is proposed, which describes a ratio of power fed in by at least one converter infeed apparatus in a voltage-impressing manner to power fed in by at least one converter infeed apparatus in a current-impressing manner. In this case, the degree of voltage impressing describes this ratio up to which the converter infeed apparatuses are intended to carry out a voltage-impressing infeed.

It has been recognized here in particular that although converter infeed apparatuses usually feed in in a current-impressing manner, for these apparatuses it is also conceivable to provide a voltage-impressing infeed if this appears to be expedient for network management, for example. Such a degree of voltage impressing can be derived from the detected static converter penetration, taking further account of which of the affected converter infeed apparatuses can actually feed in in a voltage-impressing manner. However, it is also conceivable that for an electrical supply network or a corresponding network section for converter infeed apparatuses provision is made for enabling a certain proportion, e.g., 50%, to feed in in a voltage-impressing manner. If the static converter penetration is then detected, it is possible to derive therefrom by way of said 50% mentioned by way of example the degree of voltage impressing for all infeed apparatuses in their entirety.

In accordance with one aspect, it is proposed that depending on the static converter penetration at least one control specification of a first group is activated, deactivated or set. This is proposed for the following control specifications.

Here, therefore, not just a property of the electrical supply network is derived from the static converter penetration, rather at least one control specification is used concretely. It is thus activated or deactivated, which depends on the static converter penetration, inter alia. Particularly depending on the level of the static converter penetration, it is additionally also proposed that at least one control specification of the first group is set, namely is set in terms of its level. This setting in terms of the level concerns in particular parameters of such a control specification and/or a gain factor of the relevant control specification.

A reactive power control or a voltage control is proposed as one control specification. Here a voltage is controlled with the aid of a reactive power, and so both designations can be used.

In particular, a reactive power infeed depending on a voltage deviation is proposed here. This can in particular be activated in the case of a high static converter penetration and be deactivated in the case of a very low static converter penetration. It is possible to set a gain factor between the voltage deviation and the level of the reactive power to be fed in depending thereon. A dead band range can also be set, which defines for voltage deviations a range where voltage deviations do not lead to a reactive power infeed. An upper limit and a lower limit for limiting the reactive power infeed can also be set, namely depending on the static converter penetration. In particular, provision is made for the values in each case in terms of absolute value to be set to be all the higher, the greater the static converter penetration.

Providing a rapid power reduction is proposed as one control specification of the first group. Particularly the power reduction which results in power being taken up, that is to say in which electrical power is taken up by the converter infeed apparatus and then consumed in particular by a chopper circuit, can be activated depending on the static converter penetration. It has been recognized here that the level of power to be taken up substantially depends on connected converter infeed apparatuses, independently of whether and at what level these converter infeed apparatuses feed in power. In the event of electrical power being taken up by converter infeed apparatuses, the aforementioned chopper circuits can be used, in particular, which in this case, however, can operate independently of the power infeed. They merely control an electric current by way of resistor banks in which said current is converted into heat.

In particular, this process of providing a rapid power reduction can be set such that the latter is set to be all the higher and all the more power can be consumed, the greater the static converter penetration.

In particular, such a process of providing a rapid power reduction can be used for decreasing electrical power, i.e., also for reducing the infeed power, in the case of overfrequency. It is conceivable that electrical power is still fed in overall, i.e., by all infeed apparatuses, but some or all of the converter infeed apparatuses take up and thus consume power. Although such a situation is not desirable from an energetic standpoint, this may be expedient in exceptional cases and in particular in short transition time periods. In particular, this involves providing a rapid power reduction, and such a rapid power reduction can be effected in the range of 1 to 3 seconds, in particular in the range of less than 1 second and preferably in the range of 10 to 50 milliseconds (ms). Many conventional infeed apparatuses cannot significantly reduce their power in such a short time, and so the rapid power reduction is provided by converter infeed apparatuses, until either the problem has been rectified or the other infeed apparatuses have had enough time to reduce their power infeed. By way of example, a demand for such a rapid power reduction may arise as a result of a load shedding in which a large consumer, such as a foundry, for example, was spontaneously disconnected from the network.

As one control specification of the first group, providing an instantaneous reserve by means of wind power installations as converter infeed apparatuses is proposed, in particular by means of increasing a rotational speed of the respective wind power installation in order to achieve an increased rotational energy. In particular, that is proposed if the converter infeed apparatus is operated in a power range below 40% rated power of the converter infeed apparatus. Preferably, it is proposed to effect such a process of providing an instantaneous reserve together with providing a voltage impressing by means of the wind power installations.

In particular, such a process of providing an instantaneous reserve can be offered as an entire control specification for a plurality of converter infeed apparatuses. This offer thus depends on the static converter penetration and the offer can be all the higher, i.e., all the more instantaneous reserve can be offered, the greater the static converter penetration.

In the case of the combination with a voltage impressing, provision can be made, in particular, for said instantaneous reserve to be provided for the implementation of the voltage impressing. A voltage-impressing behavior can require a particularly large amount of control energy in order to achieve this voltage impressing. This control energy can then be provided by kinetic energy that can be activated as in the case of the instantaneous reserve.

Wholly or partly carrying out a voltage impressing by means of the converter infeed apparatuses is proposed as one control specification of the first group. In the case of a low static converter penetration, the conventional power plants are dominant, particularly the conventional large power plants which feed in by means of directly coupled synchronous generators. These operate in a voltage-impressing manner owing to their functional principles, and so a voltage impressing for the converter infeed apparatuses is not required.

However, the higher the proportion of converter infeed apparatuses becomes, i.e., the higher the static converter penetration becomes, the greater the importance that may be attached to wholly or partly carrying out a voltage impressing by means of the converter infeed apparatuses. Partly carrying out a voltage impressing by means of the converter infeed apparatuses can be embodied in particular such that the relevant converter infeed apparatuses each have a plurality of converters, of which some feed in in a voltage-impressing manner and others in a current-impressing manner. In particular, provision is made for all the more power to be fed in in a voltage-impressing manner by means of the converter infeed apparatuses, the greater the static converter penetration.

Setting up phase shifter operation by means of at least one of the converter infeed apparatuses is proposed as one control specification of the first group. The greater the static converter penetration, the more capacity of converter infeed apparatuses can be used for phase shifter operation, which has already been explained above. It has been recognized here in particular that in the case of a high steady-state converter penetration often not all of the converter infeed apparatuses can be utilized; the latter can then nevertheless carry out phase shifter operation. The network can thus nevertheless be backed up; in particular, a voltage control can be carried out or supported.

As one control specification of the first group, it is proposed to effect a process of driving switched-off converter infeed apparatuses for switching on the converter infeed apparatuses and keeping available or increasing a STATCOM functionality. It is conceivable here in particular that the static converter penetration is taken into account together with a maximum static converter penetration. In this respect, the maximum static converter penetration describes a ratio of a sum of the rated powers of all converter infeed apparatuses that are connected or can be connected to the electrical supply network or the network section to a sum of the rated powers of all infeed apparatuses that are connected or can be connected to the electrical supply network or the network section. Here, too, a ratio of the converter infeed apparatuses to all infeed apparatuses is thus considered, wherein the sum of the corresponding rated powers is taken into account, but wherein here in addition the converter infeed apparatuses are considered which are not connected to the electrical supply network or the network section in particular only on account of an open disconnecting switch. In particular, this concerns a respective disconnecting switch that can be driven externally.

It is thus possible to estimate how much potential in terms of converter infeed apparatuses is still present which can be utilized by connection of these converter infeed apparatuses. This potential is intended to be utilized and be used in particular for keeping available or increasing a STATCOM functionality. This is based on the concept, in particular, that there is a reason why these converter infeed apparatuses have been switched off, and this reason may mean that there is not enough primary energy available, but it may also mean that the electrical supply network or the network section does not have an additional demand for power. In this case, however, one converter infeed apparatus, or a plurality, can nevertheless implement a STATCOM functionality, i.e., serve as phase shifter and/or feed in reactive power, in order thereby to back up the network.

As one control specification of the first group, fault ride through control is proposed, in particular activating a reactive power driving mode in which, in the event of a current limit being reached, an infeed of a reactive power is prioritized vis-à-vis an infeed of an active power. This is based on the insight, in particular, that an appreciable contribution for a fault ride through can be made in the case of a high static converter penetration. This involves in particular the ride through of a short fault, in the case of which the network voltage dips to a small value or even to zero for a short time, in particular a few seconds, in particular less than 10 seconds. Provision is made here, in particular, for the purpose of riding through said fault, of feeding in a reactive power or a reactive current, in particular a short circuit current.

If active power is still fed in, then the infeed of the reactive power is limited by a maximum apparent current limit to a greater extent than if no active power were fed in. The reactive power driving mode prioritizes the infeed of the reactive power insofar as the active power is reduced if it is only by that means that an increase in the reactive power or the reactive current can be achieved. By means of the activation of the fault ride through control, such a behavior can be prepared in order then to be carried out upon the occurrence of the fault. It is activated particularly in the case of a high static converter penetration. It can be set to be all the higher, the greater the static converter penetration. In this case, a higher activation means that the prioritization of the reactive power is all the higher, the greater the static converter penetration. A complete prioritization thus means that the reactive power is given 100% prioritization, i.e., always takes precedence over the active power infeed. In the case of a lower prioritization, a portion of the active power infeed, e.g., up to 10% or up to 20%, can be permitted.

In accordance with one aspect, it is proposed that from a detected dynamic converter penetration a control property of a second group is derived. The elements of the list of the second group are explained below. This is based on the insight, in particular, that different control properties can be derived from a detected dynamic converter penetration compared with those derived from the static converter penetration. Here, too, this is a matter of what control behavior the electrical supply network or the network section can have and in this respect the control property here, too, can be referred to as control capability.

What is proposed as one control property of the second group is a capability for providing a positive control reserve, which can increase as necessary active power fed in by the converter infeed apparatuses. In the case of a dynamic converter penetration, it is possible to gage how much power or in what proportion power from converter infeed apparatuses is presently being fed in. The higher the dynamic converter penetration, the higher therefore, too, is the power fed in by converters. Therefore, there is also potential to reduce said power and thereby to create a control reserve. Specifically, the power fed in can as necessary be increased by this reduced power, which thus constitutes the control reserve.

What is also proposed as one control property of the second group is a capability for providing a negative control reserve, which can reduce as necessary active power fed in by the converter infeed apparatuses. It holds true here, too, that an active power fed in by the converter infeed apparatuses can be gaged from the detected dynamic converter penetration. Said active power can thus also be reduced and thus forms a negative control reserve. The negative control reserve thus denotes the power by which the infeed by the converter infeed apparatuses can be reduced. It has been recognized here in particular that converter infeed apparatuses, particularly as far as reducing the power fed in is concerned, are among the fastest control units in the electrical supply network. By way of example, if a load is shed in the electrical supply network or the network section, then surplus power capacities immediately arise in the network and these can be decreased by reducing the active power fed in by converter infeed apparatuses.

What is proposed as one control property of the second group is a capability for providing an instantaneous reserve, which for wind power installations, in particular, can provide a momentary backup power from rotational energy and in particular can carry out a setting of the available instantaneous reserve by means of a setting of a rotational speed of the wind power installation.

A potential for providing an instantaneous reserve can already be derived from the static converter penetration. A capability for providing an instantaneous reserve directly arises from the dynamic converter penetration. The instantaneous reserve can thus be provided without possible operating points previously being changed. At the moment when said reserve is provided, the operating point is changed, of course, but this is not absolutely necessary in advance. This is based on the concept, in particular, that in the case of wind power installations, with respect to a power fed in, an underlying rotational speed and thus a kinetic energy present are also known with good accuracy. In particular, this also takes account of the fact that the power partly increases with the cube of the rotational speed, such that a comparatively high rotational speed is present even in the case of average power values. Therefore, there is then also already a correspondingly high kinetic energy present in the rotor.

However, it has also been recognized that the usable kinetic energy should be considered here, i.e., the energy which can be obtained from the rotation of the rotor without in the process the wind power installation losing a stable operating point and stopping. In any case, however, a capability for providing an instantaneous reserve is already present even when there is a low power fed in. Consequently, this capability for providing an instantaneous reserve may be able to be gaged from the detected dynamic converter penetration. In other words, this control property or control capability can be gaged from the detected dynamic converter penetration and it can then be taken into account in corresponding backup methods or infeed methods.

In accordance with one aspect, it is proposed that depending on the dynamic converter penetration at least one control specification of a second group is activated, deactivated or set. Elements of such a list of said second group are explained below. It has also been recognized here that not just a property or control capability of the electrical supply network can be gaged from the dynamic converter penetration, rather concrete control specifications, or at least one thereof, can also be activated or conversely, if there has been a change again in the prerequisites in accordance with the dynamic converter penetration, can be deactivated depending thereon. It is also conceivable to set the control specifications. Here it is possible to set in particular a transfer response, or gain factors, or time values, to mention just a few examples.

What is proposed as one control specification of the second group is a frequency backup control by means of setting an active power infeed depending on a network frequency. In particular, it is conceivable here that an active power proportion that is proportional to a frequency deviation of the network frequency from a frequency reference value, in particular a rated network frequency, is proposed for this purpose. A gain factor or a proportionality factor between frequency deviation and active power proportion additionally fed in can be all the higher here in terms of absolute value, the higher the dynamic converter penetration. It is conceivable here, in particular, that the gain factor or the proportionality factor is negative, or the active power fed in is reduced in some other way as the network frequency increases.

This is based on the insight that from the dynamic converter penetration a power infeed by means of converter infeed apparatuses can be inferred and potential for varying this power infeed can thus also be inferred. The setting of the frequency backup control can preferably be different between frequency overshooting and frequency undershooting. In this regard, in terms of absolute value, a proportionality factor between frequency deviation and power proportion additionally fed in can be smaller in the case of a negative frequency deviation than in the case of a positive frequency deviation.

What is proposed as one control specification of the second group is providing an instantaneous reserve by means of wind power installations as converter infeed apparatuses, in particular by means of increasing a rotational speed of the respective wind power installation in order to achieve an increased rotational energy, in particular if the converter infeed apparatus is operated in a power range below 40% of its rated power. Such a control specification for providing an instantaneous reserve, which is also applicable to the instantaneous reserves already mentioned above, can be configured such that the instantaneous reserve is provided depending on a frequency decrease in the network frequency, in particular if the network frequency decreases below a limit value and/or with a gradient which in terms of absolute value, lies above a limit gradient value of a frequency decrease. It is proposed here in particular to achieve an increased rotation energy by means of increasing the rotational speed of the respective wind power installation, and that is proposed in particular in a power range below 40% rated power of the converter infeed apparatus, i.e., of the wind power installation.

From the dynamic converter penetration together with the static converter penetration, it is also possible to gage the power range with which the converter infeed apparatuses are presently feeding in. Particularly if the dynamic converter penetration is correspondingly lower than the static converter penetration, correspondingly less power is fed in as well. If the proportion provided by the wind power installations in the power fed in by converters is dominant, which is the case particularly at night, or if the proportion or a distribution is at least known, it is possible to assess whether a rotational speed increase should be effected.

To that end, it has been recognized that in the case of a low power infeed, which specifically is below 40% of the rated power, i.e., below 40% of the maximum possible infeed, the rotational speed is still comparatively low and it is thus possible to increase the rotational speed in order to increase the rotational energy. From the dynamic converter penetration, it is also possible to gage that power is being fed in by the converter infeed apparatuses and there is thus also enough wind available to carry out such a rotational speed increase. As a result, the process of providing the instantaneous reserve can be correspondingly improved.

In this case and also in the case of the other embodiments above and below, it should always be taken into consideration that here a solution for the entire electrical supply network or at least the network section under consideration is proposed; each solution for an individual installation, i.e., an individual converter infeed apparatus, should as far as possible also be implemented in the case of many or all further converter infeed apparatuses. Consequently, an overall concept can be proposed and, staying with the example of the instantaneous reserve, a significant quantity of providable instantaneous reserve can also be had.

In the case of the other control specifications as well, both from the first group and from the second group, a correspondingly large amount of active power, reactive power or reactive current can be had. Consequently, as a result of the general consideration of the static and dynamic converter penetration, it is possible for a large potential not only to be activated but also to be taken into account generally in the network backup.

What is proposed as a further control specification of the second group is carrying out a power increase by means of converter infeed apparatuses in the event of the occurrence of a network frequency below a rated network frequency, in particular in the event of the occurrence of an underfrequency. A corresponding specification which increases the power infeed in the event of an underfrequency is thus specifically proposed here. An underfrequency can be in particular a frequency which is less than the rated network frequency by a predetermined minimum deviation value. The power increase can be realized by feeding in an instantaneous reserve or by canceling a power curtailment.

What is proposed as a further control specification of the second group is carrying out a power reduction by means of converter infeed apparatuses in the event of the occurrence of a network frequency above a rated network frequency, in particular without using chopper operation.

This therefore involves carrying out a power reduction in which positive power is reduced. Power fed in is thus reduced maximally to the value of zero. However, that does not preclude potentially being able additionally to carry out the above-described possibility of taking up power as well. It is proposed here, however, that such a positive power reduction is activated depending on the dynamic converter penetration. From the dynamic converter penetration it is possible to infer the power fed in and thus also the potential regarding the value by which the power can be maximally reduced.

What is proposed as a further control specification of the second group is a network-frequency-dependent control of loads connected to the electrical supply network. It has been recognized here that the loads, i.e., consumers connected to the electrical supply network or the network section under consideration, can likewise be controlled for the purpose of network backup. Depending on the consumer, the power taken up by the latter can be increased or reduced. Some consumers, such as a cold storage warehouse, for example, can manage with little power for a while since they usually have a high thermal capacity, such that an interruption or reduction of the cooling for a while is unproblematic. Likewise, it can also increase their power at times in order to provide a somewhat greater cooling capacity, as a result of which they manage with less power later.

Further examples may be electrical storage units or charging stations which can reduce or interrupt their charging power, as result of which the charging of the corresponding electrical storage units is delayed. Depending on when this electrical storage unit is intended to be used, such a delay may be readily acceptable.

This is also based on the insight that loads connected to the electrical supply network may often likewise be fast control units. Provided that they are driven or can be driven sufficiently, they can usually react rapidly and thus, on the consumer side, compensate for a power change which cannot be compensated for so rapidly by a large power plant. The compensation of such a changed power by consumers is preferably temporary, however, namely in particular for a time required by slow infeed apparatuses in the electrical supply network for their adaptation.

It is proposed here in particular that a network-frequency-dependent control of the loads or consumers is carried out if the dynamic converter penetration is low. In this case, the converter infeed apparatuses can carry out a rapid control, in particular a rapid change of the power infeed, only to a lesser extent and, consequently, this can be compensated for by the consumers.

What is preferably proposed, however, is a control in which the loads reduce their consumption in the case of a high dynamic converter penetration, particularly if the dynamic converter penetration reaches the value of the static converter penetration, or at least almost reaches it, namely reaches it at least apart from a deviation of 10%. Specifically, an increase in the power fed in by the converter infeed apparatuses is then virtually impossible and that can be compensated for by a reduction of the consumed power by the consumers or loads.

What is additionally provided as a control specification of the second group is a fault ride through control, in particular activating an active power driving mode in which, in the event of a current limit being reached, an infeed of an active power is prioritized vis-à-vis an infeed of a reactive power.

It has been recognized here in particular that, depending on the fault ridden through, it is important to feed in an active power. That will be possible by means of the converter infeed apparatuses particularly if the latter are presently feeding in much power, that is to say if a high dynamic converter penetration is present. Provision can additionally be made here for the active power to be prioritized, such that in the event of an active power and a reactive power being requested simultaneously, the active power is given precedence. In this case, the reactive power can be reduced down to zero, which can also depend on the prioritization chosen.

Here, too, it is proposed that the prioritization can be chosen depending on the dynamic converter penetration. The higher the dynamic converter penetration, the greater the extent to which the active power is prioritized vis-à-vis the reactive power. The reactive power proportion still permitted is thus chosen to be all the smaller, the greater the prioritization of the active power, i.e., the greater the dynamic converter penetration. It has been recognized here in particular that it is only in the case of a very high dynamic converter penetration that a permanent full utilization of current limits by the active power infeed can be expected at all and a great prioritization of the active power is thus expedient only in the case of a high dynamic converter penetration. It has also been recognized here that the following relationship holds true for the active power P, the reactive power Q and the resulting apparent power S: $P^2+Q^2=S^2$. In other words, if a maximum priority of the active power is not present, i.e., if for example a reactive power of up to 10% is permitted, this adversely affects the maximum active power only by less than 1%.

In addition, a wind energy system is proposed comprising one or a plurality of wind power installations, for feeding electrical power into an electrical supply network. The wind energy system denotes in particular a wind power installation or a windfarm. The electrical supply network is embodied in a manner such as has been explained in association with the method for feeding in electrical power. The wind energy system additionally comprises a control device (e.g., controller), by means of which the infeed is controlled in accordance with a control strategy, and this control strategy is selected depending on a static converter penetration and a dynamic converter penetration. For this purpose, the control strategy can be implemented for example as control in the control device. To that end, a process computer on which a corresponding control is implemented can be provided. The wind energy system is embodied as a converter infeed apparatus, and the control device can be connected to the at least one frequency converter or frequency inverter for control purposes. As a result, the control device, via the at least one frequency converter or frequency inverter, can control the infeed depending on a static converter penetration and depending on a dynamic converter penetration.

In this respect and also in respect of all abovementioned methods for feeding electrical power into an electrical supply network, it should be taken into consideration that many control steps or else preparations for controls are carried out by means of one converter infeed apparatus, such as the wind energy system likewise proposed. In principle, however, it is proposed to take into account a static converter penetration and a dynamic converter penetration, and this can concern far more than just one converter infeed apparatus or one wind energy system. In this case, it is conceivable, in particular, that a plurality of converter infeed apparatuses are controlled simultaneously in the manner as has been explained in each case. It is particularly advantageous to effect such a coordination in order thereby to achieve a great control potential by means of a large number of converter infeed apparatuses, specifically to have available or to be able to control much power for control purposes.

Provision is made here in particular for providing a coordination by way of a central control unit for all affected converter infeed apparatuses. This central control unit can also include the control of loads. The control by means of such a central control unit can be manifested in particular such that the relevant units, i.e., the converter infeed apparatuses and optionally the loads or consumers, acquire corresponding setpoint values. Such setpoint values can be in particular information for selecting or setting control specifications. They can also include information about control properties or control capabilities. The units can then optionally adapt thereto by themselves and take account of the network properties thus registered.

The wind energy system can comprise one or a plurality of wind power installations. In particular, voltage- and frequency-dependent behaviors of the infeed can be implemented directly at the respective frequency converter or frequency inverter. That is provided in particular for behaviors which have to operate very rapidly, such as, for example, the rapid power reduction explained and also the process of providing an instantaneous reserve, to mention a few examples. Each frequency converter or frequency inverter can have a dedicated control unit for this purpose.

The control device, which can be provided at a central location of the wind energy system, is then used in particular for coordination. If the wind energy system comprises a plurality of wind power installations, said control device can be embodied as a so-called farm controller, which transmits corresponding setpoint values to the individual wind power installations and thus to the individual frequency converters or frequency inverters.

Such setpoint values can also include commands for activating, deactivating or setting control specifications. They can also include information about derived control properties or control capabilities of the electrical supply network or of the network section.

In accordance with one aspect, a wind energy system is proposed which comprises a data interface prepared for exchanging control information from the list comprising a detected static converter penetration, a detected dynamic converter penetration, control properties and control specifications. The data interface can be prepared for this exchange in particular by virtue of the fact that it is equipped with corresponding connecting lines or transmitting and receiving units (e.g., transmitters and receivers) for a wireless data transfer. In addition, the data interface is prepared for being able to read and/or write a data protocol enabling the exchange to be carried out. Furthermore, the data interface is internally connected to the control device in order by this means to forward the control information to the control device or to receive it from the latter for transmission.

Additionally or alternatively, it is proposed that the control device is prepared to generate for transmission and additionally or instead to evaluate for infeed control one, a plurality or all of the items of control information. A combination is also conceivable in which the control device receives some items of information and generates and outputs other items of information. In particular, it is conceivable that the control device obtains a detected static converter penetration as information and obtains a detected dynamic converter penetration as information and generates therefrom the control properties and control specifications, or a portion thereof. To that end, the criteria that have been explained above in accordance with the corresponding embodiments can be implemented in the control device. The result can be output and transmitted to other units via the data interface. The evaluation can, of course, also be used by the control device itself for controlling the infeed.

However, it is also conceivable for information to be gathered from which the static and the dynamic converter penetration are determined in the first place. In that case, at least the last step of detecting these two converter penetrations is effected in the control device. The control device can be correspondingly prepared for this by virtue of the respective steps being implemented there in particular as a program.

In accordance with one aspect, it is proposed that the wind energy system, in particular its control device, is prepared to carry out at least one method in accordance with any of the embodiments described above. That can therefore be effected in particular by means of a corresponding implementation of programs from the control device. Insofar as the control steps are not carried out at all in the wind energy system, such as, in particular, the control of loads or consumers, the control device can generate corresponding control commands or other items of information and, by means of the data interface, in particular, can transmit them to the units at which the control is intended to be carried out.

BRIEF DESCRIPTION OF THE SEVERAL VIEWS OF THE DRAWINGS

The invention is explained in greater detail below by way of example on the basis of embodiments with reference to the accompanying figures.

DETAILED DESCRIPTION

Figure 1:
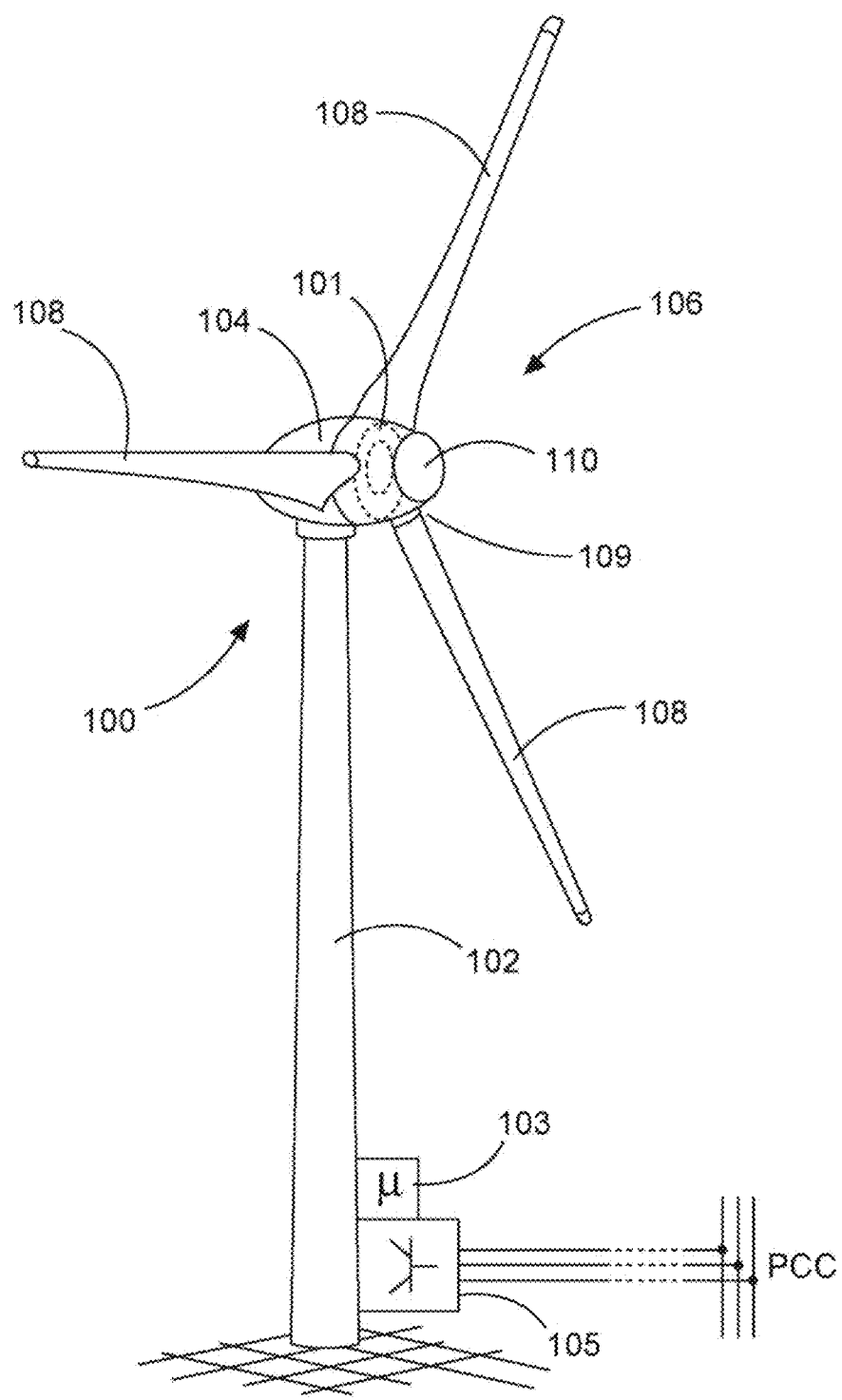
FIG. 1 shows a wind power installation in a perspective illustration.

FIG. 1 shows a schematic illustration of a wind power installation. The wind power installation 100 comprises a tower 102 and a nacelle 104 on the tower 102. An aerodynamic rotor 106 comprising three rotor blades 108 and a spinner 110 is provided on the nacelle 104. The aerodynamic rotor 106 is caused to effect a rotational movement by the wind during operation of the wind power installation and thereby also rotates an electrodynamic rotor of a generator, which is coupled to the aerodynamic rotor 106 directly or indirectly. The electrical generator is arranged in the nacelle 104 and generates electrical energy. The pitch angles of the rotor blades 108 can be varied by pitch motors on the rotor blade roots 109 of the respective rotor blades 108.

In this case, the wind power installation 100 comprises an electrical generator 101, indicated in the nacelle 104. Electrical power can be generated by means of the generator 101. An infeed unit 105, which can be embodied as an inverter, in particular, is provided for feeding in electrical power. It is thus possible to generate a three-phase infeed current and/or a three-phase infeed voltage according to amplitude, frequency and phase, for infeed at a network connection point PCC. That can be effected directly or else jointly with further wind power installations in a windfarm. An installation controller 103 is provided for controlling the wind power installation 100 and also the infeed unit 105. The installation controller 103 can also acquire predefined values from an external source, in particular from a central farm computer. The installation controller 103 can form or include a control device, which may also synonymously be referred to as a control unit.

Figure 2:
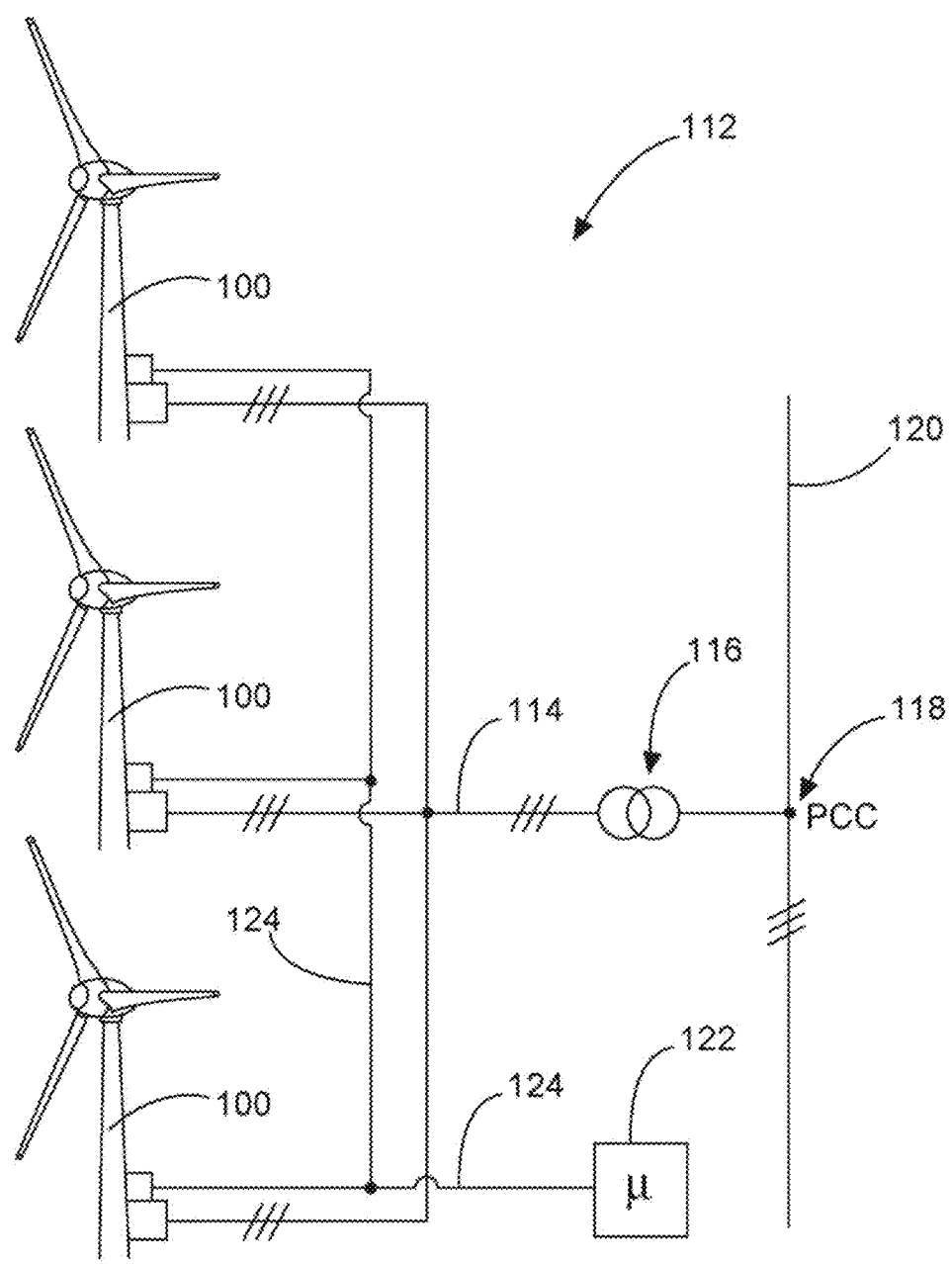
FIG. 2 shows a windfarm in a schematic illustration.

FIG. 2 shows a windfarm 112 comprising for example three wind power installations 100, which can be identical or different. The three wind power installations 100 are thus representative of basically an arbitrary number of wind power installations of a windfarm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a windfarm 112, this illustration not showing a controller, for example, even though a controller is present, of course. Moreover, for example, the farm network 114 can be configured differently, with for example a transformer also being present at the output of each wind power installation 100, to mention just one different exemplary embodiment.

The windfarm 112 additionally comprises a central farm computer 122, which may synonymously also be referred to as a central farm controller and which can form or include a control device or control unit. Said computer can be connected to the wind power installations 100 via data lines 124, or in a wireless manner, in order thereby to exchange data with the wind power installations and in particular to acquire measured values from the wind power installations 100 and to transmit control values on the wind power installations 100.

Figure 3:
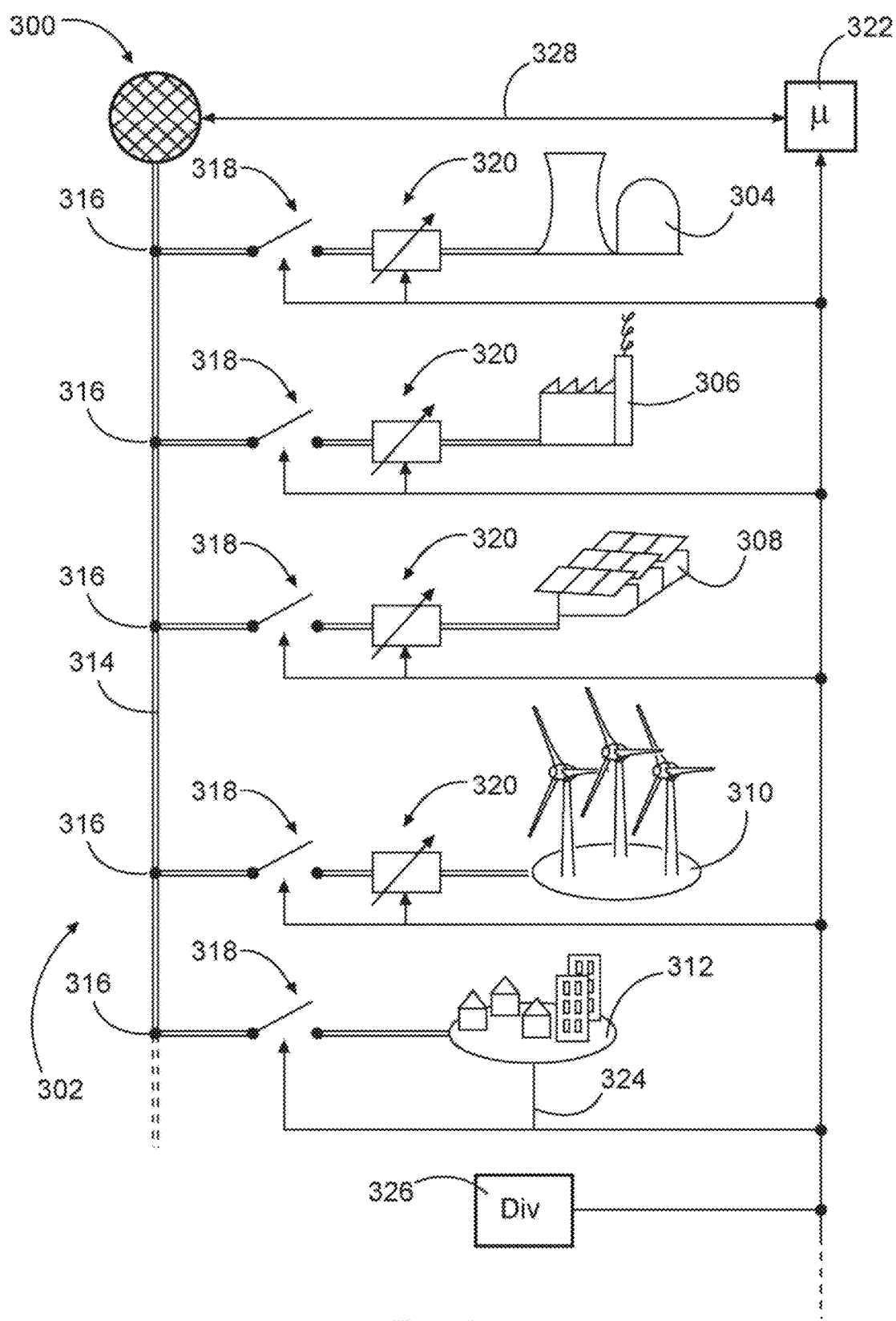
FIG. 3 schematically shows a network section with a plurality of exemplary consumers and generators.

FIG. 3 shows a network section 302, which is part of an electrical supply network 300. The electrical supply network 300 is illustrated symbolically here and can correspond to the electrical supply network 120 from FIG. 2. The exemplary network section 302 comprises a large power plant 304 as an example of a conventional infeed apparatus. Furthermore, provision is made of a factory 306 as an example of a consumer, namely a controllable consumer. A photovoltaic installation 308 and a windfarm 310 each form an infeed apparatus, namely a converter infeed apparatus. Finally, a town/city 312 is also depicted, which forms a consumer, namely a non-controllable consumer.

Each of the consumers and generators mentioned is connected to an exemplary supply line 314. By this means, in each case at a network connection point 316, electrical power can be fed into the transmission line 314 or be drawn therefrom. Such a network connection point 316 usually ought to have a transformer in order to transform general voltage differences between the voltage in the transmission line 314 and the connected consumer or generator.

Often, moreover, a large power plant such as the large power plant 304 is connected to a transmission line with a different fundamental voltage level compared with a town/city such as the town/city 312. For simplification, such details have been omitted here and, likewise for simplification, all network connection points 316 have been provided with just these reference signs, even though they may differ from one another. Moreover, the transmission line 314 and other connecting lines between the generators or consumers are illustrated as double lines in order to clarify that these cables or lines are provided for transmitting energy. As differentiation therefrom, data lines are illustrated by a single line.

All consumers and infeed apparatuses illustrated in FIG. 3 are additionally coupled to the transmission line 314 via a network disconnecting switch 318. These network disconnecting switches 318 may also differ from one another, in particular in terms of the power which they can transmit or isolate and the voltage for which they are designed. Nevertheless, for simplification, the same reference sign 318 has been chosen for all the network disconnecting switches. During regular operation of the network section 302, most or all of the disconnecting switches 318 should be closed. They can be opened, however, and the opened illustration in FIG. 3 serves merely to make the respective network disconnecting switch 318 more recognizable. A preferred switch position should not be inferred from that.

Apart from the town/city 312, all generators and the factory 306 are coupled as a controllable consumer via a controller 320. The controller 320 is intended to elucidate the fact that the power that is exchangeable between the transmission line 314 and the respective infeed apparatus or generator is settable. The controller 320 is also intended to clarify that a set power transmission of the respective generator or of the consumer can also be detected by way thereof. However, these controller 320 essentially serve for elucidation and the setting of a power to be transmitted is actually carried out in each case in the corresponding generators or the corresponding consumer. Particularly in the case of the converter infeed apparatuses, i.e., the photovoltaic installation 308 and the windfarm 310, a setting and also detection analogously to the depiction in FIGS. 1 and 2 are conceivable. In the case of the large power plant 304, a setting ought essentially to be carried out by way of the setting of a steam input into a steam turbine, to mention one example.

Each network disconnecting switch 318 and each controller 320 are connected to a control device, which is embodied here as a central control unit (e.g., central controller) 322. The central control unit 322 can thus obtain and process items of information about the switch position of each network disconnecting switch 318 and likewise items of information about the power respectively exchanged. The central control unit 322 obtains these items of information by way of example from the controller 320 in each case. However, that is intended to be an example of the fact that these and also other items of information can be exchanged between the respective infeed apparatus and consumer. The mutual exchange is also symbolized by the fact that all data connections between the central control unit 322 at one end and the network disconnecting switches 318 and controller 320 at the other end are illustrated as double-headed arrows. In this sense a unidirectional line 324 to the town/city 312 is also illustrated in order to elucidate the fact that it is conceivable that there, only at one end, items of information from the town/city are taken up and transmitted to the central control unit 322. However, it is also conceivable, of course, that individual consumers in the town/city 312 could be controlled by the central control unit 322.

Finally, an information source 326 for diverse items of information is also depicted symbolically in FIG. 3. Such an information source can also be representative of a plurality of information sources and can supply the central control unit 322 with diverse items of information. The latter can include a weather forecast, such that the information source 326 or a part thereof is then representative of a weather service. However, it is also conceivable to use for example information of a direct marketer that knows information about an envisaged drawing of power by various consumers of the electrical supply network.

In addition to the shown possibility for control by the central control unit 322, a control data line 328 is also provided, via which further elements in the electrical supply network 300 or the network section 302 can be controlled. The control data line 328 is also provided by bidirectional operation, such that the central control unit 322 can also receive items of information from the electrical supply network 300 or the network section 302. Such items of information may be for example switching states of further network disconnecting switches that switch network sections within the electrical supply network 300. Such further network disconnecting switches can also be driven via the central control unit 322.

With respect to the central control unit 322, it is also conceivable for this central control unit to be arranged for example in a windfarm such as the windfarm 310. By way of example, a powerful computer in such a windfarm, which is additionally coupled to many elements in the electrical supply network, can perform the task of the central control unit 322.

FIG. 3 is of schematic nature in this respect and provision can also be made for not every infeed apparatus or every consumer to be connected to the central control unit 322. Information about infeed apparatuses or consumers that are not connected to the central control unit 322 can be estimated from the other infeed apparatuses or consumers, for example. If all the windfarms are running with rated power, for example, it should be assumed that a further windfarm not connected to the central control unit 322 is likewise running with rated power. The same applies to correspondingly reduced operation.

Insofar as an infeed apparatus or consumer cannot be controlled via the central control unit 322, it should correspondingly be taken into account in the control concept. That means, on the one hand, that it cannot be driven directly, yet its behavior can nevertheless be taken into account. If a further windfarm is present, for example, but it cannot be driven, the fact that such a windfarm implements existing network specifications should be known or what specifications are implemented by this windfarm may be specifically known. That includes for example how such a windfarm reacts to a voltage dip.

At the same time, a conventional power plant can be provided which likewise cannot be driven via the central control unit 322. With respect to such a large power plant, how it behaves in the aforementioned example of a voltage dip would then likewise be known. All that can thus nevertheless be taken into account in the envisaged control when feeding electrical power into the electrical supply network.

Figure 4:
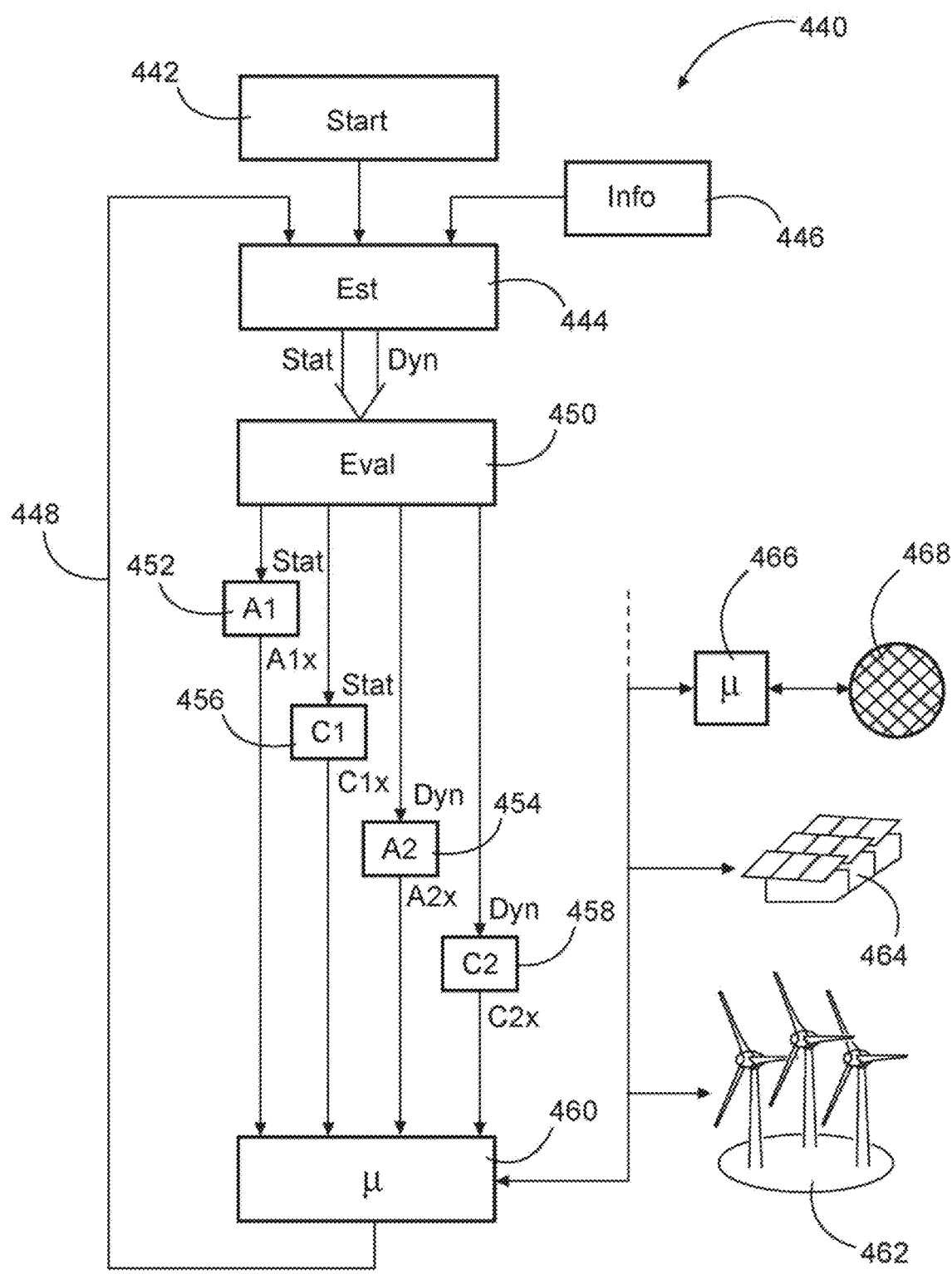
FIG. 4 schematically shows an extended flow chart.

FIG. 4 shows an extended flow diagram 440. This flow diagram is referred to as an extended flow diagram 440 because a linkage to elements of an electrical supply network is additionally depicted symbolically.

The extended flow diagram 440 begins with a start block 442. The system can thus be initialized. Initial information can thereby be provided, too, which can be used if no present information is available, in particular if no present information is available at the beginning.

In accordance with the flow diagram, a static and a dynamic converter penetration are then estimated in the estimation block 444. This can be done on the basis of information input externally. This includes in particular specific information concerning rated powers of generators, concerning values of power presently being fed in, and concerning switch positions of network disconnecting switches. The information can be taken up as explained for the central control unit 322 in FIG. 3. In particular, two basic possibilities are conceivable here, namely firstly taking up general information via an information block 446, as was explained with respect to the information source 326 in FIG. 3. Secondly, it is possible to obtain information about infeed apparatuses, consumers and network disconnecting switches of these infeed apparatuses and consumers in the course of the process via the feedback connection 448. That will also be described further below.

In any case the static converter penetration and the dynamic converter penetration are estimated in the estimation block 444. Provided that correspondingly complete information is available, the static converter penetration and/or the dynamic converter penetration can also be calculated in each case.

The result is then passed into the evaluation block 450, which controls the further evaluation. In this case, the further evaluation can be implemented in particular by means of a first and second attribute block 452 and 454 and also a first and a second control block 456 and 458.

The first attribute block 452 obtains from the evaluation block 450 the ascertained static converter penetration and depending thereon determines control properties or control capabilities of a first group. A control property of a first group is symbolized as A1 in the attribute block 452. Moreover, the attribute block 452 can output different control properties of the first group, which are symbolized as A1x, with "x" as a variable index. Correspondingly, the first control block 456 likewise obtains the ascertained static converter penetration, but does not derive therefrom control properties or capabilities of the electrical supply network, but rather specific control specifications, referred to as control specifications of a first group. Available control specifications of the first group are symbolized as C1 in the first control block 456, but a plurality of or different specific control specifications can be output, which is identified by C1x, here as well as with "x" as a variable index.

Analogously, the second attribute block 454 obtains the ascertained dynamic converter penetration and depending thereon determines at least one control property or control capability of a second group. Moreover, the second control block 458 likewise obtains the ascertained dynamic converter penetration and determines therefrom at least one specific control specification of a second group. The thus ascertained control properties of the first and second groups and control specifications of the first and second groups are then passed to the control block 460 for implementation.

To that end, the control block 460 communicates at least with a windfarm 462, a photovoltaic installation 464 and a central control unit 466. The central control unit (e.g., central controller) 466 can correspond to the central control unit 322 from FIG. 3 and can correspondingly process information and itself also provide information. Accordingly, a connection to an electrical supply network 468 is also illustrated symbolically. The control block 460 can thus transmit information to the units shown, transmit and thereby implement control specifications, and also itself obtain information.

The transmission of control specifications can be configured in particular such that correspondingly appropriate control specifications are already implemented in the respective elements, i.e., in particular the exemplary windfarm 462 and the exemplary photovoltaic installation 464, and are activated by the control block 460. The activation can also include the transmission of specific setting parameters for the corresponding control specification in order thereby to set gain factors or relevant times, for example. In the same way, provision can also be made for one or more control specifications to be stored in the central control unit 466 and to be activated by the control block 460. It is then also conceivable that the central control unit 466 effects driving of the relevant units, including the photovoltaic installation 464 or the windfarm 462.

The information that the control block 460 additionally gathers in the process can be transferred to the estimation block 444 by said control block via the feedback connection 448. The feedback connection 448 is moreover also representative of the elucidation that the sequence elucidated in FIG. 4 is carried out recurrently in a loop, e.g., every minute or every five minutes or at least every quarter of an hour, to mention a few examples.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for feeding electrical power into an electrical supply network,
   wherein the electrical supply network includes:
      a plurality of consumers configured to consume the electrical power from the electrical supply network; and
      a plurality of infeed apparatuses configured to feed the electrical power into the electrical supply network, wherein an infeed apparatus of the plurality of infeed apparatuses is associated with a rated power, and the infeed apparatus of the plurality of infeed apparatuses is a converter-based infeed apparatus that feeds power using at least one frequency converter or frequency inverter, or a non-converter-based infeed apparatus other than the converter-based infeed apparatus, and
   wherein the method comprises:
      controlling the feeding of the electrical power depending on a static converter penetration and a dynamic converter penetration of the electrical supply network or of a network section of the electrical supply network, wherein:
the static converter penetration is a ratio of
a sum of rated powers of all converter-based infeed apparatuses, of the plurality of infeed apparatuses, coupled to the electrical supply network or the network section, to
a sum of rated powers of all of the plurality of infeed apparatuses coupled to the electrical supply network or the network section, and
the dynamic converter penetration is a ratio of
power fed in by all converter-based infeed apparatuses, of the plurality of infeed apparatuses, coupled to the electrical supply network or the network section, to
power fed in by all of the plurality of infeed apparatuses coupled to the electrical supply network or the network section.

2. The method as claimed in claim 1, comprising:
controlling the feeding of the electrical power depending on a converter reserve power, wherein the converter reserve power is a ratio of:
the power fed into the electrical supply network or the network section by all converter-based infeed apparatuses of the plurality of infeed apparatuses, to
a power to which all converter-based infeed apparatuses can increase the power fed in.

3. The method as claimed in claim 1, comprising:
estimating the static converter penetration depending on at least one estimation criterion of a first group of estimation criteria selected from a list including:
a detected wind speed,
a detected insolation,
a detected present network load of the electrical supply network or of the network section,
an activation specification for activating converter-based infeed apparatuses, and
a known number of connected and non-infeeding converter-based infeed apparatuses, and/or
estimating the dynamic converter penetration depending on at least one estimation criterion of a second group of estimation criteria selected from a list including:
a detected power fed into the electrical supply network from renewable energy sources,
a detected present network load of the electrical supply network or of the network section, and
a detected converter reserve power.

4. The method as claimed in claim 1, comprising:
determining from a detected static converter penetration a control property of a first group selected from a list including:
a reactive power adjustment capability with a reactive power adjustment range,
a dynamic network backup property characterized by a short circuit current to be fed in,
a potential for providing an instantaneous reserve, and
a degree of voltage-impressing representing a ratio of power fed in by at least one converter-based infeed apparatus in a voltage-impressing mode to power fed in by at least one converter-based infeed apparatus in a current-impressing mode, with respect to which or up to which converter-based infeed apparatuses perform a voltage-impressing infeed.

5. The method as claimed in claim 1, comprising:
activating, deactivating or setting at least one control specification of a first group depending on the static converter penetration, the at least one control specification of the first group being selected from a list including:
a reactive power control or a voltage control,
providing a rapid power reduction,
providing an instantaneous reserve using wind power installations as converter-based infeed apparatuses,
wholly or partly performing voltage impressing using converter-based infeed apparatuses,
establishing a phase shifter operation using at least one of the converter-based infeed apparatuses,
driving switched-off converter-based infeed apparatuses for switching on the converter-based infeed apparatuses and keeping available or increasing a STATCOM functionality, and
performing a fault ride through control.

6. The method as claimed in claim 5, wherein providing the instantaneous reserve includes increasing a rotational speed of a wind power installation to increase rotational energy.

7. The method as claimed in claim 6, wherein the instantaneous reserve is in a power range below 40% rated power of the converter-based infeed apparatus.

8. The method as claimed in claim 5, wherein performing the fault ride through control includes particular activating a reactive power driving mode in which, in the event of a current limit being reached, an infeed of a reactive power is prioritized over an infeed of an active power.

9. The method as claimed in claim 1, comprising:
determining a control property of a second group from the dynamic converter penetration, the control property of the second group being selected from a list including:
a capability for providing a positive control reserve, which increases active power fed in by the converter-based infeed apparatuses,
a capability for providing a negative control reserve, which decreases active power fed in by the converter-based infeed apparatuses, and
a capability for providing an instantaneous reserve.

10. The method as claimed in claim 9, wherein for a wind power installation, the capability for providing the instantaneous reserve provides a momentary backup power from rotational energy and sets an available instantaneous reserve by setting a rotational speed of the wind power installation.

11. The method as claimed in claim 1, comprising:
activating, deactivating or setting at least one control specification of a second group depending on the dynamic converter penetration, the at least one control specification being selected from a list including:
a frequency backup control using setting an active power infeed depending on a network frequency,
providing an instantaneous reserve using wind power installations as converter-based infeed apparatuses,
performing a power increase using converter-based infeed apparatuses in response to a network frequency below a rated network frequency,
performing a power reduction using converter-based infeed apparatuses in response to a network frequency above a rated network frequency,
a network-frequency-dependent control of loads coupled to the electrical supply network, and
a fault ride through control.

12. The method as claimed in claim 11, wherein the power reduction is performed without using chopper operation.

13. The method as claimed in claim 11, wherein in a fault ride through control, an active power driving mode is activated, and in response to a current limit being reached, an infeed of an active power is prioritized over an infeed of a reactive power.

14. A wind energy system, comprising:
one or more wind power installations configured to feed electrical power into an electrical supply network, wherein:
the electrical supply network includes:
a plurality of consumers configured to consume the electrical power from the electrical supply network, and
a plurality of infeed apparatuses configured to feed the electrical power into the electrical supply network, wherein an infeed apparatus of the plurality of infeed apparatuses is a converter-based infeed apparatus or a non-converter-based infeed apparatus, the infeed apparatus of the plurality of infeed apparatuses is associated with a rated power, wherein:
a converter-based infeed apparatus is configured to feed the electrical power using at least one frequency converter or frequency inverter, and
a non-converter-based infeed apparatus is other than the converter-based infeed apparatus, and
the wind energy system is a converter-based infeed apparatus; and
a controller configured to control feeding the electrical power depending on a static converter penetration and a dynamic converter penetration of the electrical supply network or of a network section of the electrical supply network, wherein:
the static converter penetration is a ratio of
a sum of rated powers of all converter-based infeed apparatuses, of the plurality of infeed apparatuses, coupled to the electrical supply network or the network section, to
a sum of rated powers of all of the plurality of infeed apparatuses coupled to the electrical supply network or the network section, and
the dynamic converter penetration denotes a ratio of
power fed in by all converter-based infeed apparatuses, of the plurality of infeed apparatuses, coupled to the electrical supply network or the network section, to
power fed in by all of the plurality of infeed apparatuses coupled to the electrical supply network or the network section.

15. The wind energy system as claimed in claim 14, comprising:
a data interface configured to exchanging control information selected from a list including:
the static converter penetration,
the dynamic converter penetration,
control properties, and
control specifications.

16. The wind energy system as claimed in claim 15, wherein the controller is configured to generate the control information for transmission and/or evaluate the control information.

* * * * *